United States Patent [19]

Ewing et al.

[11] Patent Number: 5,259,554

[45] Date of Patent: Nov. 9, 1993

[54] TEMPERATURE RESPONSIVE, PILOT OPERATED LINE VALVE WITH SHAPE MEMORY ALLOY ACTUATOR

[75] Inventors: William A. Ewing, Bethel; Richard L. Martin, Southbury, both of Conn.

[73] Assignee: Memry Corp., Brookfield, Conn.

[21] Appl. No.: 883,543

[22] Filed: May 15, 1992

[51] Int. Cl.⁵ .............................................. G05D 23/02
[52] U.S. Cl. ...................................... 236/87; 236/930
[58] Field of Search ................ 236/87, 93 R, 93 B, 236/101 R

[56] References Cited

U.S. PATENT DOCUMENTS

| | | | |
|---|---|---|---|
| 2,271,850 | 2/1942 | Zinkil | 236/93 R X |
| 2,868,459 | 1/1959 | Modes | 236/87 |
| 3,450,342 | 6/1969 | Arledge, Jr. | 236/93 R X |
| 4,227,646 | 10/1980 | Hart et al. | 236/93 R |
| 4,241,872 | 12/1980 | Frankenberg | 236/87 |
| 4,981,261 | 1/1991 | Bergmann et al. | 236/93 B |

*Primary Examiner*—William E. Tapolcai
*Attorney, Agent, or Firm*—Jerry Cohen; Harvey Kaye

[57] ABSTRACT

A shape memory effect actuated diaphragmatic anti-scald valve, including a valve housing having a fluid flow path therethrough and including a pilot chamber. There is a first valve seat within the housing and a second valve seat within the housing and downstream from said first valve seat. A pilot valve is located within the chamber of the valve housing for preventing fluid flow through the chamber in which the pilot valve element is located when the SME valve is in its normal flow position and a first valve element is retained seated on the first valve seat by the pilot valve. There are means for controlling the open and closed positions of the pilot valve depending upon the temperature of the fluid flowing through the SME valve. A diaphragm defines a second valve element for the second valve seat and located in the main path of flow for the SME valve and being in an open position when fluid is flowing through the normal flow path and the fluid is directed at the bottom thereof for holding it off the second valve seat the second valve element in its first position opens a port which allows water pressure on the top side of the center of the diaphragm urging it to close against the second valve seat and in its second position in which the second valve element is open and the diaphragm is moved to its open position unseated from the second valve seat to permit normal water flow.

4 Claims, 3 Drawing Sheets

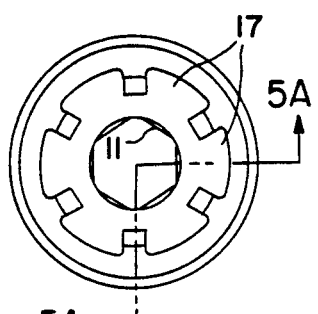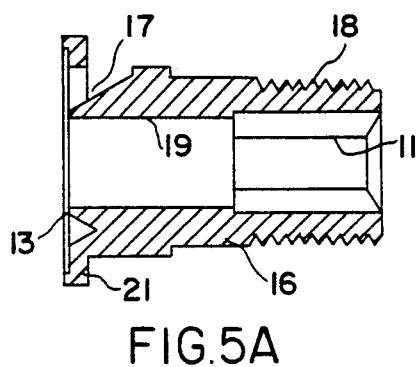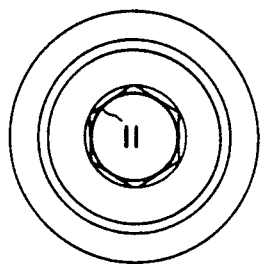
FIG.5B  FIG.5A  FIG.5C
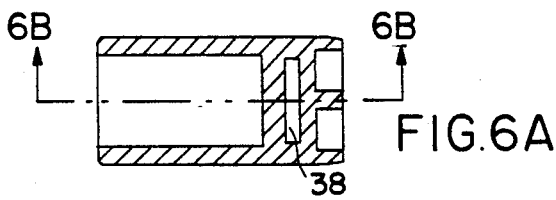
FIG.6A
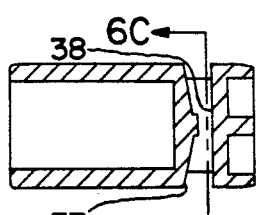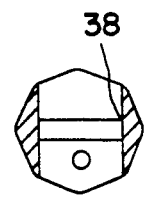
FIG.6B  FIG.6C

5,259,554

TEMPERATURE RESPONSIVE, PILOT OPERATED LINE VALVE WITH SHAPE MEMORY ALLOY ACTUATOR

FIELD OF THE INVENTION

The present invention relates to line valves, and, more particularly, but not limited to, hot fluid supply lines as well as shower lines, bath tub fill lines, and sink fill lines.

BACKGROUND OF THE INVENTION

There is a possibility for serious injury to occur in certain types of plumbing, for example, a person could be scalded by water which suddenly becomes extremely hot, and methods are sought by which the danger of these situations can be eliminated.

For example, it is estimated that every day about 300 young children are taken to emergency rooms throughout the country suffering from burns from household water that is too hot. As a result about 3,000 children annually are injured seriously enough as to require hospitalization.

These dangers are not limited to children, but are also a problem for the elderly and those who suffer from diabetes and other disease that reduce the ability to sense temperature changes.

Water temperatures that water heaters are set for can cause third-degree burns in about 2 seconds at 150° F. and in about 5 seconds at 140° F. Children can be burned more quickly because their skin is more sensitive.

The problem is not limited to water lines, but occurs wherever hot fluid is being conducted through pipes, including some industrial processes.

Accordingly, it is a main object of the present invention to provide such a valve which has a shut-off mechanism so that the fluid supply pressure is quickly shut down whenever the fluid becomes too hot.

It is another object of the present invention to provide a safety valve of the type described in which, after activation of the valve due to high fluid temperature, the valve need not be manually reset, but is reset when the temperature cools to below the activation temperature of the valve.

It is a further object of the present invention to provide an economical, easy to use, valve that will close and with increasing temperature and reopen with decreasing temperature.

It is still a further object of the present invention to provide a safety valve which can be installed within a fluid pipe.

SUMMARY OF THE INVENTION

The present invention provides a pilot valve system which uses a leaf spring made of metallurgical transformed memory material, e.g., martensitic metallurgical transformation shape memory effect (SME) alloy. When the fluid is cool the leaf is deflected and the pilot valve is held closed by a bias spring. Under this condition the main valve element comprising a diaphragm is in its open position and flow is unimpeded. When the temperature of the fluid increases to a predetermined level, a metallurgical transformation takes place in the leaf spring. Stiffness of the leaf spring increases and it returns to an undeflected shape which deflects the bias spring and unseats the pilot valve. With the pilot valve unseated, fluid fills the cavity behind the diaphragm causing it to seat so that the main flow path is blocked. An orifice in the center of the diaphragm allows a small bleed flow.

The pilot valve is sized larger than the diaphragm orifice so that the pressure behind the diaphragm is greater than the downstream pressure. This prevents the diaphragm from opening. When the fluid temperature is decreased to a predetermined level, a metallurgical transformation takes place in the leaf spring decreasing its stiffness so that the bias spring deflects the leaf spring and closes the pilot valve. The bleed flow allows removal of the high temperature fluid which expedites heat transfer from the leaf spring. With the pilot valve closed the fluid bleeds from behind the diaphragm allowing it to open.

Other objects, features, and advantages will be apparent from the following detailed description of preferred embodiments taken in conjunction with the accompanying drawing in which:

BRIEF DESCRIPTION OF THE DRAWINGS

FIG. 5A is a cross sectional view through the lower housing along two radii 90 degrees.

FIG. 5B is a left end view of the top of the lower housing.

FIG. 5C is a right end view of the bottom of the lower housing.

FIG. 6A is a cross sectional view through the plunger.

FIG. 6B is a cross sectional view through the plunger taken at a right angle to the view of FIG. 6A.

FIG. 6C is a sectional view taken through the slot in the plunger.

DETAILED DESCRIPTION OF THE PREFERRED EMBODIMENTS

Figure 1:
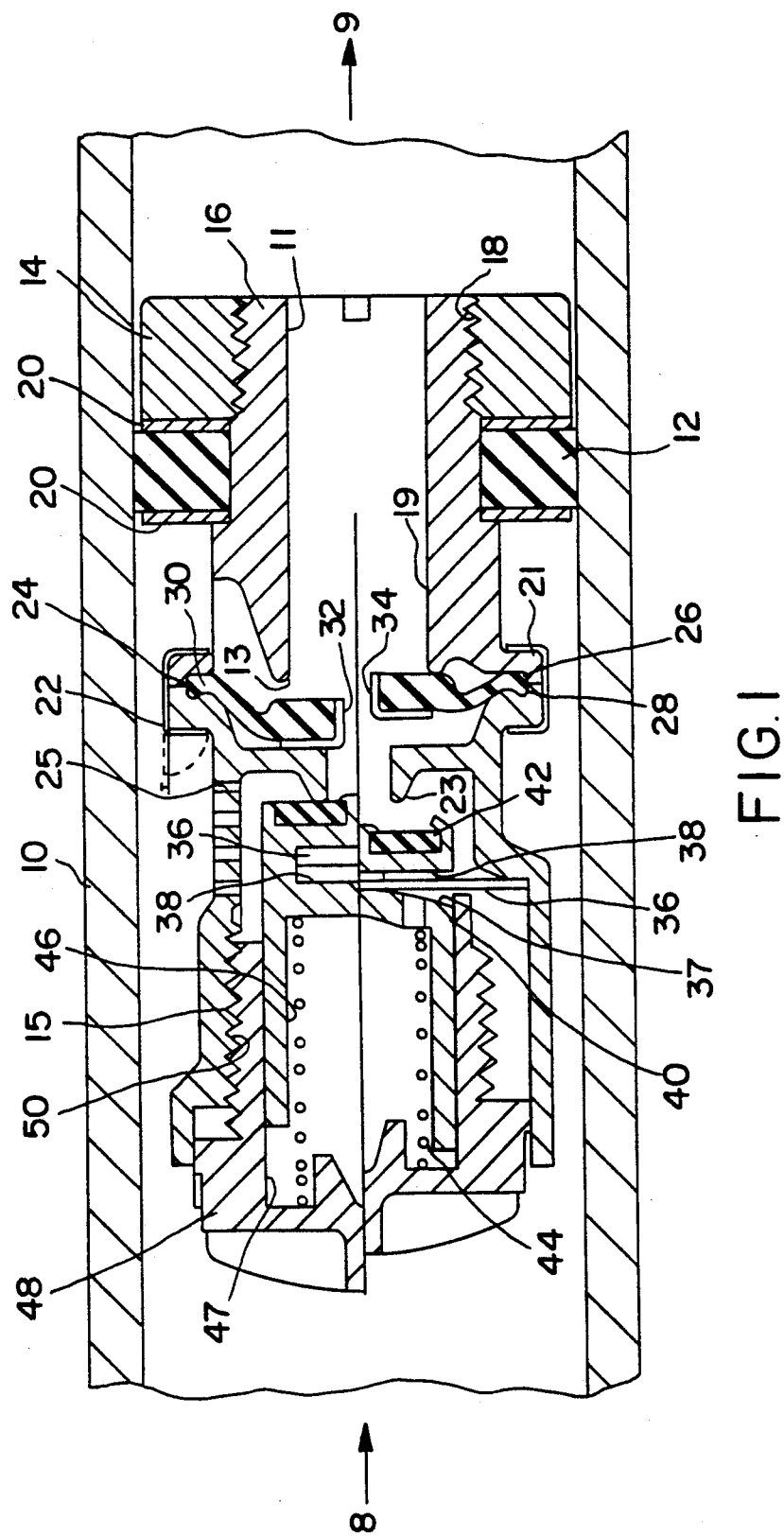
FIG. 1 is a longitudinal sectional view through a first embodiment of the valve of the present invention and along two different radii at a 90 degree angle.

FIG. 1 shows a first embodiment of the valve installable inside the flow pipe or tube 10. The valve has a fluid passing therethrough from inlet 8 to the outlet 9 as designated by the arrows in FIG. 1. The valve is fixed in position by means of a seal/retainer 12 which is axially compressed and radially expanded by a jam nut 14. The nut 14 is attached to the lower housing 16 by means of threads 18. Washers 20 on either side of the seal/retainer 12 provide support for and allow the compression of the seal/retainer 12.

The bottom opening 11 of the lower housing has a polygonal shape so that a suitably shaped tool may be used to rotate the lower housing with respect to the nut and thereby to compress the seal/retainer 12 and lock the SME valve in place in the pipe. At the upper end the opening or bore 19 communicates with section 11 and directs the main fluid flow through the lower housing. At the upper end of the lower housing there is a valve seat 13 for use in closing and opening the main fluid supply by means of a diaphragm valve element 24 being seated and unseated on the valve seat 13.

At the upper end of the lower housing there are six slots 17 (FIG. 5B) equi-spaced around the periphery to provide a path of flow for the main fluid flow in the usual position of the valve. There is an outwardly extending flange 21 which is used to hold the diaphragm valve element 24, and also, together with a similar part at the lower end of the upper housing 15, is connected in a manner further discussed below.

The upper housing 15 is attached to the lower housing 16 by means of a crimped ferrule 22. FIG. 1 shows in a dotted lines one portion of the ferrule prior to its being bent to hold the two housings together. At the same time the diaphragm 24 is fixed in place by means of capturing a bead 26 on its periphery 28 in a mating pocket 30 in the upper housing 15 and lower housing 16. An orifice plate 32 attached to the diaphragm 24 provides support and a fixed orifice 34 for control of residual flow.

A leaf spring 36 made of shape memory effect (SME) alloy is supported in a slot (not shown) in the upper housing 15 and passes into a slot 38 provided for it in the pilot valve or plunger 40. A seal 42 is attached to the face of the pilot valve 40 to insure proper seating of the pilot valve 40 against valve seat 23 in the upper housing. A bias spring 44 rides in the bore 46 of the pilot valve 40 and provides a counter active force for the leaf spring 36 to operate against. An adjustment cap 48 is attached to the upper housing 15 by means of threads 50 and acts as a guide for the pilot valve 40 which slides axially in the bore 47 of the adjustment cap 48. The adjustment cap 48 is used to vary the load of the bias spring 44 on the SME leaf spring 36 and thereby to regulate the force needed to move the pilot valve and thus the temperature at which the valve activates.

The valve in FIG. 1 is divided longitudinally with the upper cross section displaying the valve in its normal operating condition, and the lower cross section displaying the valve in its actuated condition when hot water above the preselected temperature is flowing through the valve. Also, in the upper cross section the adjustment cap has been unscrewed some so that there is less tension on the bias spring as compared to the lower cross section where the cap has been screwed in more to provide a greater bias on the bias spring.

In operation when the fluid flowing through the valve is cool or tepid, but not hot, the water flows into the inlet 8 and against the adjustment cap 48, around the cap, down the outside of the valve structure along the inner surface of the tube or pipe 10 to the upper washer 20. The flow is through the plurality of slots 17 (FIG. 5A) in the lower housing 16 through the bore 19 in the lower housing.

The SME leaf spring 36 during normal fluid flow is overcome by the force of the bias spring 44 and the pilot valve in closed position as shown in the upper cross section in FIG. 1. When the water becomes hot above a preselected temperature (which is adjusted by use of the adjustment cap) the leaf spring becomes more rigid and the bias spring can no longer overcome the force of the leaf spring and the pilot moves to the left as viewed in FIG. 1 and the force the bias spring had been applying to the pilot valve is removed.

FIG. 1 is taken along two different radial planes at right angles to one another. The upper half of the figure shows the valve in the open position of the lower valve seat, with normal water flow at the rate set by the user in the usual manner and the diaphragm 24 in the open position. The lower half is shown in actuated condition when the heat of the fluid has exceeded the preselected value and closed.

There is a crystalline change in SME material depending upon the temperature, and the change can occur at different points depending upon how the SME material is made. Before it becomes hot it has a low modulus of elasticity and therefore the bias spring 44 overcomes the force of the SME leaf sprint 36 and the pilot 40 is moved to the right to close the upper valve seat 23 which leaves the diaphragm 24 apart from the lower valve seat 13 and there is normal fluid flow. In this position the pilot valve 40 is in the position shown at the top of FIG. 1 and the leaf spring 36 conforms to the slanted portion 37 of the slot 38. As the temperature rises there is a phase change and the modulus of elasticity increases significantly and the leaf spring 36 returns to its flat condition by overcoming the opposing force of the bias spring 44. There is a slot 38 in the pilot or plunger 40 which extends through the pilot when flow is normal the water goes around the valve and along the inner periphery of the pipe 10 and then though the slots 17 in the lower housing 16 where the water flows around the lower valve seat 13 and into the tube 10. The pressure of the water passing through the slots 17 in the lower housing 16 keeps the diaphragm 24 in its upper and open position.

However, when the leaf spring becomes hot from the water, it becomes more rigid so that the bias spring 44 can no longer overcome its force and the pilot 40 opens and unseats the valve element 42 from the upper valve seat 23 to permit water flow through the slots 25 in the upper housing and through the bleed orifice 34 so that a small amount of water continues to flow. Thus, after the user has adjusted the water faucets the cooler water will cool the SME leaf spring 36 and it becomes less rigid so that at one point the bias spring 44 overcomes the force of the leaf spring 36 and the valve reverts to its original open condition with normal water flow.

The temperature at which this occurs can be adjusted by turning the bias adjustment cap 48 to make the bias spring 44 more compressed to provide more bias or which sets the valve to actuate at a higher temperature, or to a less compressed condition so that the actuation takes place at a lower temperature.

Figure 3A:
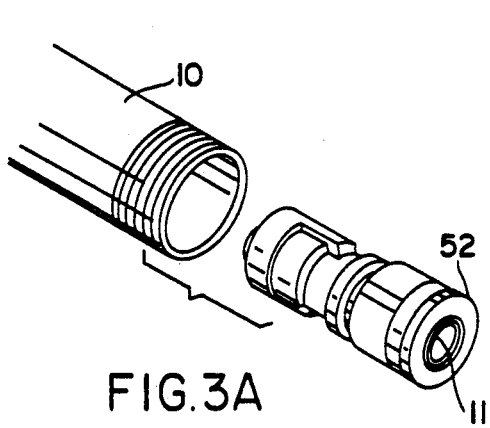
FIG. 3A is a diagrammatic view of a valve being inserted into an existing shower arm.
Figure 4A:
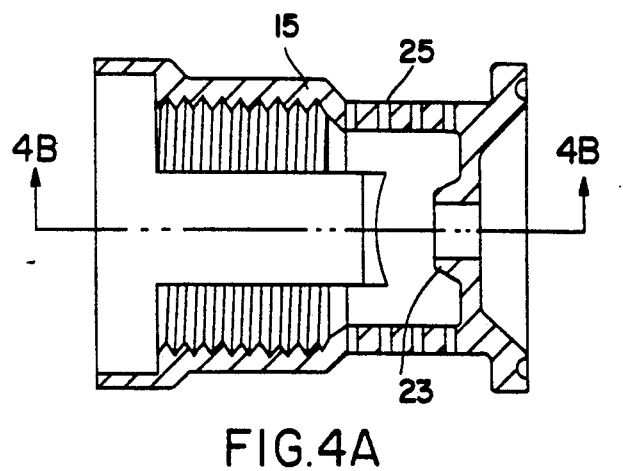
FIG. 4A is a cross sectional view through the upper housing.
Figure 3B:
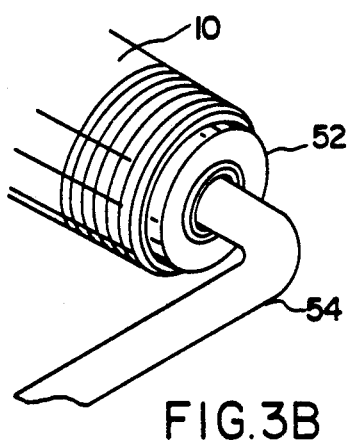
FIG. 3B is a diagrammatic view of a valve being locked into place with an Allen Wrench.
Figure 4B:
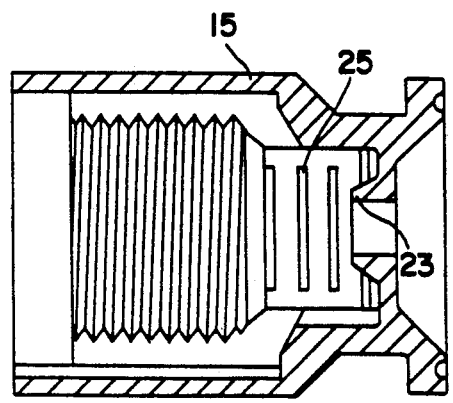
FIG. 4B is a cross section view through the upper housing and at a right angle to the view in FIG. 4A.

The valve is easy to install in all its forms and can be retrofitted for most applications. The valve of FIG. 1 is for use within a water pipe at a lavatory or sink and can be locked into position within the pipe by rotating the lower housing 16 with respect to the nut 14 which has a polygonal opening 11 to permit it to be turned by use of a correctly shaped tool. The valve shown in FIGS. 3A and 3B has a shelf or flange 52 at the bottom of the lower housing 16 so that it can be inserted into the shower arm pipe 10 of an existing shower by removing the shower head. The flange 52 prevents the valve from being inserted too far into the pipe 10, and a wrench 54 is used to lock the valve in place as described earlier, and the shower head is than screwed back into place.

Figure 2:
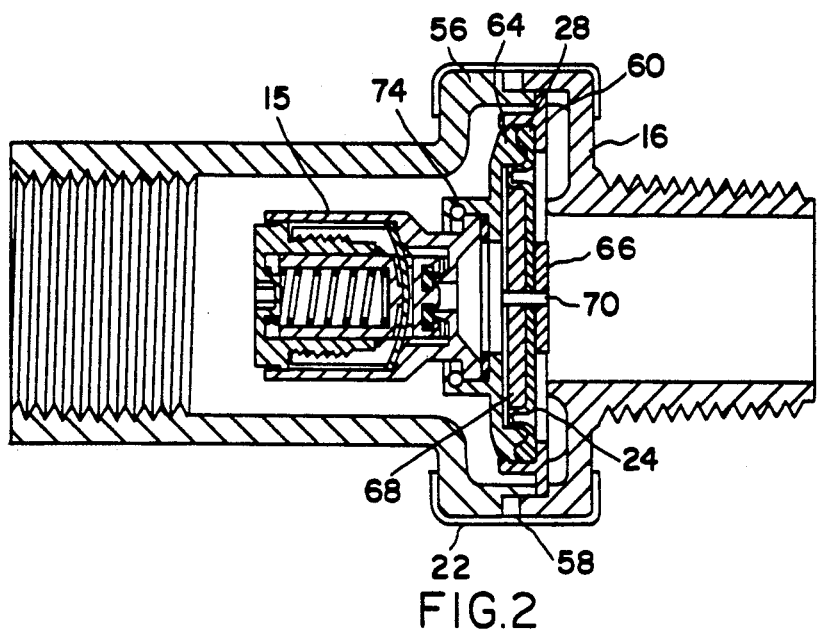
FIG. 2 is a longitudinal sectional view through a second embodiment of the valve.

The valve of FIG. 2 is particularly suitable for a bath which usually has a larger pipe diameter than a shower or sink spigot, and therefore has a modified construction from the FIG. 1 embodiment. Similar parts have been provided with the same reference numerals. The lower housing 16 mates with the outer housing 56 and a ferrule 22 is used to hold them together, with an O-ring 58 between their meeting edges. There is a spider 60 held in place by the outer and lower housings in cooperation. There is a T-shaped section 62 which provides a corner into which the peripheral bead 28 on the diaphragm 24 can be placed, and held in this position in cooperation with an intermediate part 64 which is between the upper and lower housings. There is a washer 66 at the lower side of the diaphragm 24 and a larger washer 68 at the upper side of the diaphragm, both having central openings 70 in the lower washer and 72 in the upper washer to provide for bleed flow. A snap spring 74 holds the upper housing 15 in place with respect to the intermediate part 64. The pilot or plunger 40 and adjustment cap 48 are connected to the upper housing 15 by threaded connections 50, and this valve operates the same manner as the valve described above operates with respect to FIG. 1, but for use with larger diameter pipes.

The use of an SME leaf spring in conjunction with a pilot valve allows the use of less of the SME material than prior forms of coil type springs because it is a pilot valve being operated to trigger the main valve, rather than the main valve itself. Therefore, less of the SME material is used than previously and it is less expensive to manufacture. Since the cost of the SME material can be in the vicinity of 50% of the total cost of materials for the valve, this is a good economical manner of constructing an SME type of safety valve.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A shape memory effect actuated diaphragmatic anti-scald valve, comprising:
    valve housing means having a longitudinal fluid flow path therethrough and including a pilot chamber;
    a pilot valve seat within said housing means;
    a diaphragm valve seat within said housing means and downstream from said pilot valve seat;
    diaphragm means defining a valve element for said diaphragm valve seat;
    a pilot valve element within the chamber of said valve housing means for preventing fluid flow through the chamber in which the pilot valve element is located and the pilot valve element is retained seated on the pilot valve seat by the pilot valve;
    shape memory effect means for controlling the open and closed positions of the pilot valve depending upon the temperature of the fluid flowing through the valve housing means;
    said diaphragm valve element being located in the main path of flow for said pilot valve element valve and being in an open position when fluid is flowing through the normal flow path and the fluid is directed at the bottom thereof for holding it off the diaphragm valve seat;
    said pilot valve element in its open position opening a port which allows water through the pilot valve urging the water to close the diaphragm valve against the diaphragm valve seat and in its closed position shutting off water through the pilot valve to allow the diaphragm valve element to be moved to its open position unseated from the diaphragm valve seat to permit normal water flow;
    a small opening in the center of said diaphragm means for allowing and controlling residual flow therethrough to permit cooler fluid to bring the valve back to an open position when the fluid is at a desired temperature wherein when the incoming fluid cools, the SME means moves the pilot into its closed position and pressure on top of diaphragm bleeds out the residual flow orifice, allowing pressure on the bottom side to force the diaphragm off the seat and normal flow is resumed.

2. A valve as defined in claim 1, wherein said controlling means includes an SME element.

3. A valve as defined in claim 2, wherein said SME element is a leaf spring.

4. A valve as defined in claim 2, further comprising a plunger which engages the valve element controlling means, the apparatus as a whole being constructed and arranged so that the valve will not be activated unless the means for controlling the valve element is exposed to fluid at said predetermined, elevated temperature.

* * * * *